(12) United States Patent
Lecharpentier et al.

(10) Patent No.: US 12,155,136 B2
(45) Date of Patent: Nov. 26, 2024

(54) TERMINAL DEVICE FOR A SHIELDED CABLE WITH MINERAL INSULATION

(71) Applicant: THERMOCOAX, Caligny (FR)

(72) Inventors: Denis Lecharpentier, Putanges-le-Lac (FR); Gilles Marie, Athis-Val-de-Rouvre (FR)

(73) Assignee: THERMOCOAX, Caligny (FR)

( * ) Notice: Subject to any disclaimer, the term of this patent is extended or adjusted under 35 U.S.C. 154(b) by 0 days.

(21) Appl. No.: 17/624,667

(22) PCT Filed: Jul. 10, 2020

(86) PCT No.: PCT/EP2020/069574
§ 371 (c)(1),
(2) Date: Jan. 4, 2022

(87) PCT Pub. No.: WO2021/005215
PCT Pub. Date: Jan. 14, 2021

(65) Prior Publication Data
US 2022/0278469 A1    Sep. 1, 2022

(30) Foreign Application Priority Data

Jul. 10, 2019 (FR) .................................... 1907740

(51) Int. Cl.
| | |
|---|---|
| *H01R 11/11* | (2006.01) |
| *H02G 15/04* | (2006.01) |
| *H01B 9/02* | (2006.01) |
| *H01R 4/56* | (2006.01) |

(52) U.S. Cl.
CPC ........... *H01R 11/11* (2013.01); *H02G 15/046* (2013.01); *H01B 9/02* (2013.01); *H01R 4/56* (2013.01)

(58) Field of Classification Search
CPC .. H01B 9/02; H01R 4/56; H01R 11/11; H01R 9/05; H02G 15/046; H02G 15/02
See application file for complete search history.

(56) References Cited

U.S. PATENT DOCUMENTS 3,798,348 A * 3/1974 van Toorn ............... H05B 3/06
439/805
4,059,330 A * 11/1977 Shirey .................. H01R 9/0518
29/874

(Continued)

FOREIGN PATENT DOCUMENTS

| FR | 1150390 A | 1/1958 |
|---|---|---|
| FR | 2988514 B1 | 9/2018 |
| JP | 264169 U | 5/1990 |

OTHER PUBLICATIONS

International Search Report issued on Sep. 29, 2020, in corresponding International Application PCT/EP2020/069574; 4 pages (with English Translation).

*Primary Examiner* — Vanessa Girardi
(74) *Attorney, Agent, or Firm* — Maier & Maier, PLLC

(57) ABSTRACT

A terminal device for a cable with mineral insulation, including a metal bushing of which one end is intended to be secured to the end of the cable and a ceramic insulating element. The ceramic insulating element is a cylinder accommodated in the bushing, with one end projecting from the bushing and its opposite end, which has a bore, accommodated in the bushing, the end of the cylinder that is accommodated in the bushing having a tapered shape.

11 Claims, 3 Drawing Sheets

(56) References Cited

U.S. PATENT DOCUMENTS

| | | | | |
|---|---|---|---|---|
| 4,408,822 A | * | 10/1983 | Nikitas | H01R 9/0521 |
| | | | | 439/583 |
| 4,447,107 A | * | 5/1984 | Major, Jr. | H01R 9/05 |
| | | | | 439/584 |
| 5,548,088 A | * | 8/1996 | Gray | H01R 4/489 |
| | | | | 439/585 |
| 5,558,538 A | * | 9/1996 | Delalle | H01R 4/723 |
| | | | | 439/583 |
| 9,583,933 B1 | | 2/2017 | Campbell | |
| 2012/0138361 A1 | * | 6/2012 | Elliott | H01R 9/05 |
| | | | | 174/74 R |

* cited by examiner

[Fig. 1]
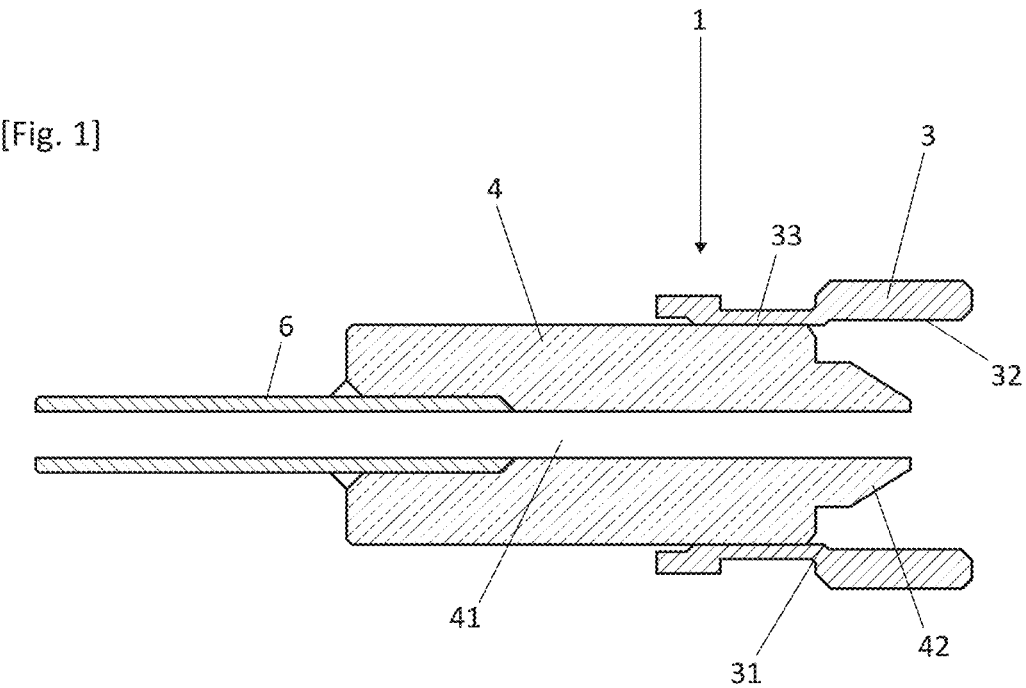
[Fig. 2]
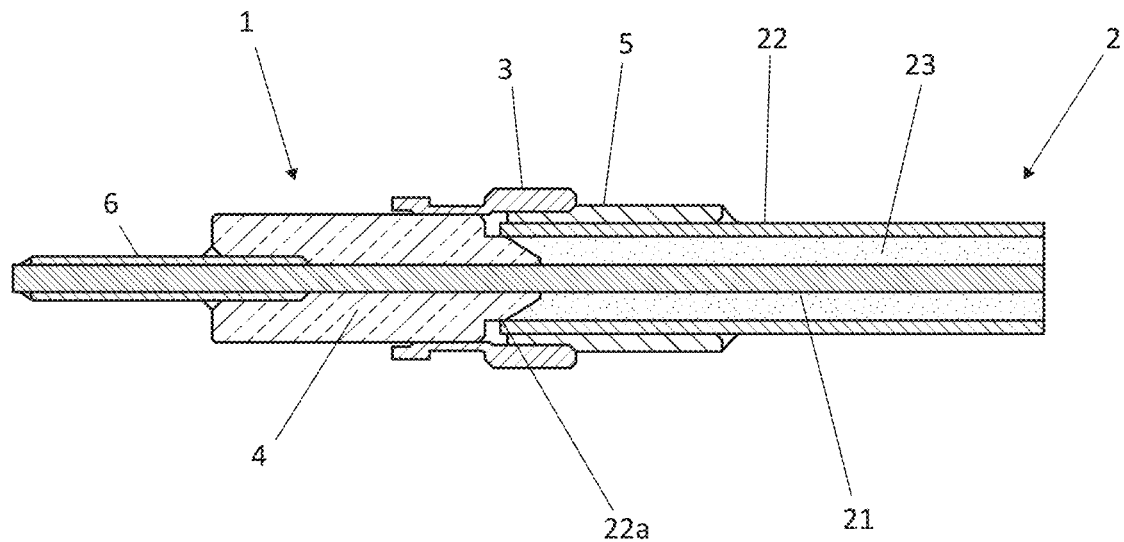

[Fig. 3]
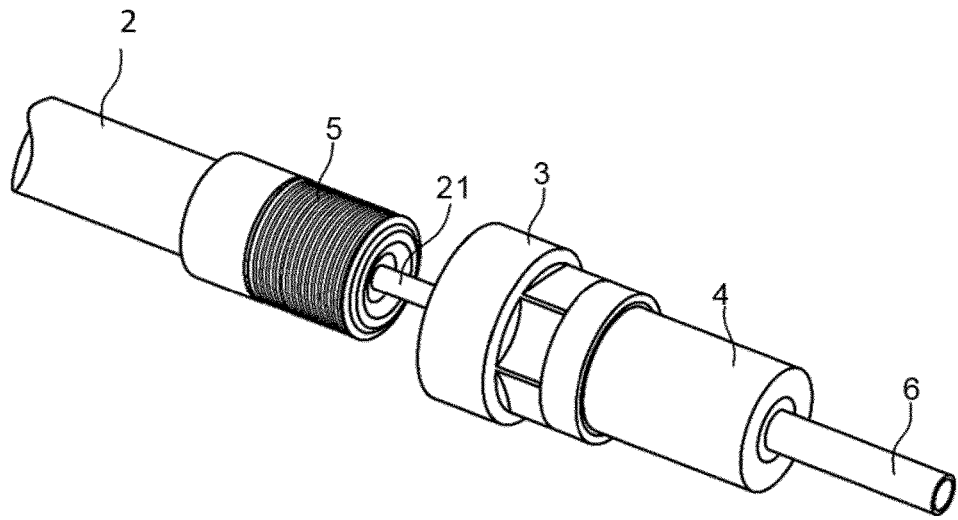
[Fig. 4]
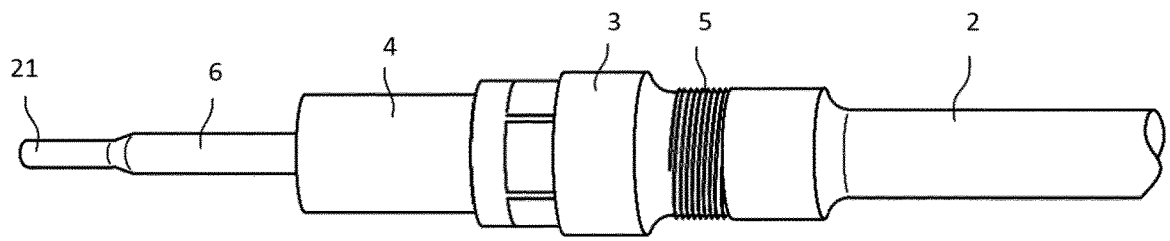
[Fig. 5]
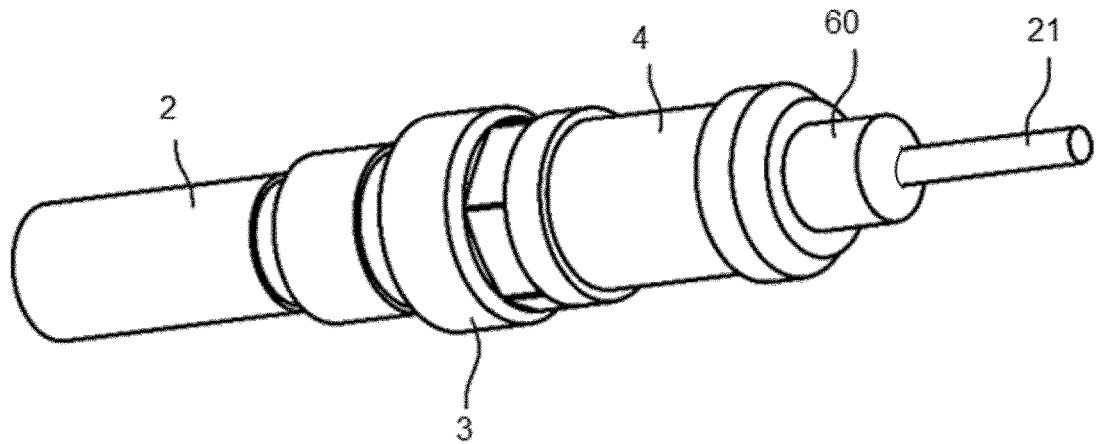

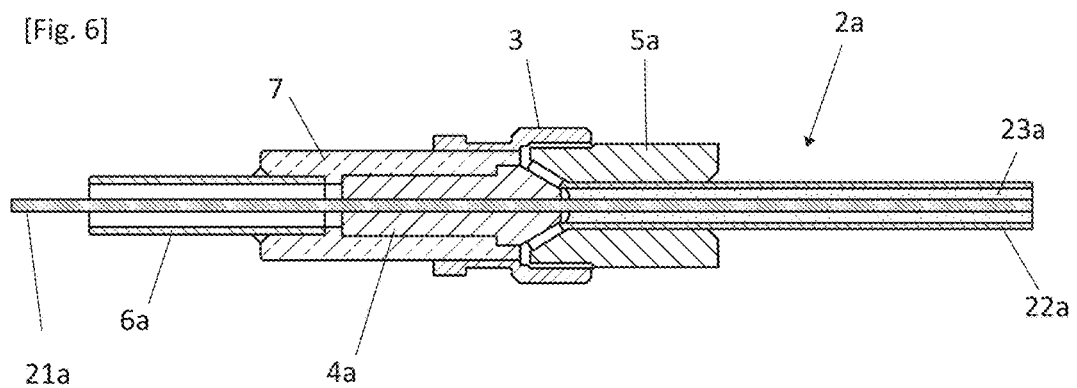
[Fig. 6]
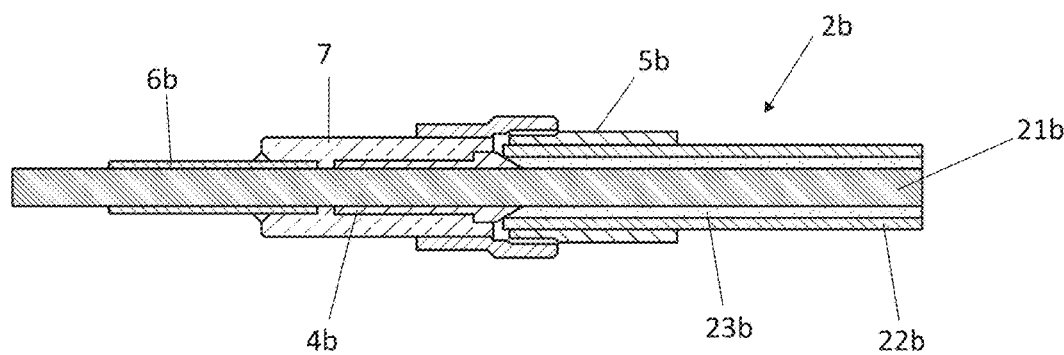
[Fig. 7]
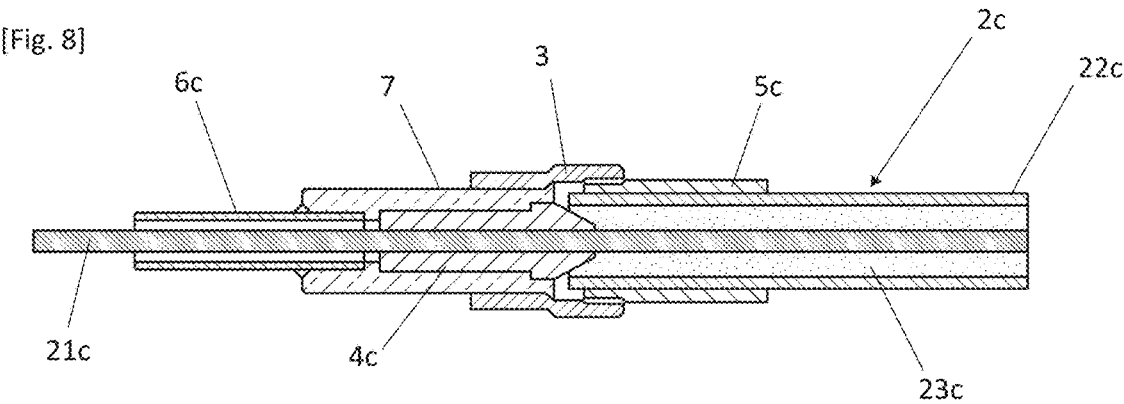
[Fig. 8]

TERMINAL DEVICE FOR A SHIELDED CABLE WITH MINERAL INSULATION

FIELD

The present invention relates to a terminal device for a shielded mineral insulated cable which offers a good hermeticity and very good dielectric strength, to several thousand volts, at high temperatures, in particular up to 1000° C.

BACKGROUND

Shielded mineral insulated cables are cables made up of a metal central conductor and a cylindrical hollow metal sheath between which is inserted a powdered refractory insulation such as a mineral, for example magnesia, alumina or silica, the outer sheath being made of stainless steel, copper or an Ni—Cr alloy such as that known under the trade name Inconel 600.

Such cables are fire resistant and used in places that may be frequented by the public such as shopping centers, airports, reception halls, or in industrial environments with hazardous areas such as nuclear power plants. They are used in particular in many areas of industry involving the use of sensors, heating elements or electrical signal transmission cables, which must withstand environments presenting increasingly demanding conditions (temperature, high voltage, humidity, etc.).

Such cables thus serve to connect devices which are spaced apart from one another and it is therefore necessary to provide means for connecting these cables to the devices, or indeed for connecting cables to one another.

Cable terminal devices and more generally connectors are extremely critical parts of these components since they must ensure the electrical continuity of the conductors, prevent the migration of moisture into the insulation while preserving the dielectric strength of the cable.

In practice, this is often a weak point because it can sometimes be difficult to ensure all of these properties simultaneously in a hot environment.

A shielded cable can therefore be an electric heating element or a signal transmission cable with mineral insulation such as magnesia, alumina or silica and with an outer sheath made of stainless steel, copper or an Ni—Cr alloy.

When a shielded mineral insulated cable is stripped to fit a terminal device such as a connector, the outer sheath and the mineral insulation are thus removed to reveal the metal conducting wire and the intrinsic dielectric barrier of the cable at the connector/cable interface is greatly weakened. To be specific, after this operation, the mineral insulation, which is in principle compacted, leaves room for air and the dielectric strength then depends solely on the distance between the conducting wire and the sheath and on environmental parameters such as the temperature, the pressure at this interface.

In order to maintain the dielectric strength, various types of terminal devices have been proposed. In FR-A-1150390, an accessory for insulating an electric cable is proposed, consisting of two ceramic plugs each having an end of conical shape and connected to one another by a glass seal. These two plugs are housed in a metal tube and have a central through bore in which the conductor of the cable can be accommodated. The electric cable consists of a central conductor, housed in an outer sheath, hygroscopic mineral insulation being placed between the outer sheath and the central conductor. The mineral insulation at the end of the cable has a conically shaped annular cavity which receives a conically shaped end of a ceramic plug constituting an insulator. The latter consists of two ceramic plugs connected to a glass seal, these two plugs being housed in a metal sheath. The conical end of the insulator is received in the conical cavity at the end of the cable while the metal sheath of the insulator is welded to the outer sheath of the cable. These assembly conditions allow the hygroscopic insulation to be protected against moisture.

FR-A-2 832 558 describes a cylindrical coupling sleeve comprising a first inlet which can be mounted on the outer periphery of the metal sheath of a first mineral insulated cable and a second end mounted on the outer periphery of a second cable or of a complementary device, the sleeve thus mounted is directly welded to the outer periphery of the connected elements. The sleeve thus forms a cavity in which the electrical conductors are connected. The sleeve has an opening allowing said cavity to be filled with an insulating material. However, it is difficult to guarantee the dielectric strength of such a connector device since the compactness of the mineral insulating material introduced is not really controllable.

It has also been proposed to make the terminations of mineral insulated cables using epoxy or acrylic resins. Even though these resins provide good electrical strength and good sealing, they cannot withstand temperatures above 230° C. A device of this type is described in particular in U.S. Pat. No. 6,437,246 which discloses a metal sleeve crimped onto the outer sheath of the cable with its interior filled with epoxy resin surrounding the free end of the conductor or the connection with another conductor. Likewise, the terminations can be made using ceramic cement or even fusible glass. The latter solutions have the drawbacks of low resistance to high temperatures and frequent cracking which compromises the resistance to humidity of the cable.

U.S. Pat. No. 9,583,933 proposes a termination device for a mineral insulated cable comprising a conducting element forming a pin and comprising a cavity for receiving the electrical conductor corresponding to a stripped end of the cable, the pin being engaged around the conductor up to the cable itself. Around this pin, at the cable, a sealing ring is also fitted between the metal pin and the mineral insulation contained in the sheath. An insulating sleeve is fitted around the metal pin. To prevent moisture from corrupting the mineral insulation, the end is heated during assembly. However, in view of the assembly, the sealing ring is inserted between the mineral insulation and the electrical conductor after having removed a portion of the mineral insulation around the conductor, or the end of the termination device is conical so as to be wedged in the mineral insulation. Such a device also requires O-rings to ensure airtightness, which limits use at high temperatures. The seal can therefore deteriorate over time due to aging of the materials, moisture can enter, etc.

Terminal devices such as glass-to-metal seal feedthroughs, which typically withstand 500° C., or ceramic-to-metal seal feedthroughs, having a resistance up to 1000° C., have also been proposed. However, this type of connector requires exposure of the ceramic insulation and the conductor of the cable during stripping, thus leaving the possibility for an electric arc to form in service between the conductor and the shielding. This risk is all the greater if the cable operates at high voltage (for example for a shielded heating element or a signal transmission cable connected to specific detectors). High voltages thus cannot be applied in the long term.

Such a termination element is thus described in FR-B-2 988 514 in which the end of a mineral insulated cable carries a termination sleeve consisting of a sleeve tube provided at one end with a ceramic insulating element having two through holes in which termination tubes are housed, the other end being mounted on the end of the stripped cable, a mineral insulating material being inserted between the end of the cable and the ceramic element. The bare conductor thus passes through the insulating material, then the ceramic element through the termination tubes. To ensure dielectric strength, the empty space of the termination sleeve is filled with mineral insulation, which is placed between that of the cable and the ceramic insulating element. In this case, too, the compactness of the mineral insulation is difficult to control.

SUMMARY

In order to overcome the drawbacks of the prior art devices, the present invention proposes a terminal device which guarantees dielectric strength (to several thousand volts), which can be used under harsh environmental conditions such as high temperatures for example up to 1000° C. while being of a simple design and easy to implement on a shielded mineral insulated cable.

To this end, the invention relates to a terminal device for a mineral insulated cable, this terminal device meaning a device forming the terminal end of a cable or a device forming a connector with another cable or device, for example, making it possible to overcome the drawbacks of existing devices.

In particular, the invention relates to a terminal device for a mineral insulated cable, comprising a metal bushing, one end of which is intended to be secured to the end of the cable, and a ceramic insulating element, characterized in that said ceramic insulating element consists of a cylinder housed in the bushing, with one end projecting from said bushing and its opposite end, which has a bore, housed in the bushing, said end of the cylinder that is housed in the bushing having a tapered shape.

Thus, advantageously, such a terminal device may be mounted at the end of a mineral insulated cable which has been stripped such that the stripped conductor of the cable may be engaged in the bushing and then in the bore of the ceramic insulating element, the bushing being positioned on the outer periphery of the cable so as to be secured thereon, the tapered shape of the insulating element allowing the cylindrical insulating element to gradually move forward against the mineral insulation, thereby allowing the ceramic cylinder to exert a compressive stress on the surface of the mineral insulation. In this way, since the stripping causes a local loss of compactness of the insulation, the compressive stress exerted against this insulation by the tapered tip of the ceramic insulating element restores this compactness, allowing the cable to include a uniform dielectric barrier, with no weak point.

The leakage path is thus advantageously lengthened since the conductor and the metal sheath of the cable are no longer facing one another. For an electric arc to form, it will have to travel a much longer leakage path, outside the terminal device. This implies a much higher breakdown voltage.

Preferably, the bushing is secured by brazing to the ceramic insulating element.

According to a preferred embodiment of the invention, the tapered end of the ceramic cylinder is conical.

According to a first embodiment, the ceramic insulating element has a bore, the end of which projecting from the bushing can be closed off, the terminal device thus constituting a device for terminating the mineral insulated cable.

Thus, advantageously, the stripped conductor is engaged in the bushing so as to engage in the bore, the bushing being engaged on the outer periphery of the cable so as to be secured thereon while the tapered end of the cylinder surrounding the conductor bears on the mineral insulation surrounding said conductor in order to compress said mineral insulation. Once the stripped end of the conducting wire is housed in the bore, the bore is closed off and the terminal device forms the terminal end of a cable.

According to a second embodiment, the ceramic insulating element has a through bore at the end of which a metal tube is mounted, secured for example by brazing on the ceramic insulating element, at the end of the insulating element projecting from the bushing, the terminal device thus constituting a connector device.

Thus, advantageously, this terminal device may be secured on the end of a mineral cable which has been stripped beforehand, such that the stripped conductor is engaged in the bushing so as to engage in the through bore of the cylinder and project from the terminal device through the tube, the bushing being engaged on the outer periphery of the cable so as to be secured thereon while the tapered end of the cylinder surrounding the conductor bears on the surface of the mineral insulation surrounding said conductor in order to compress said mineral insulation.

According to an alternative embodiment, the terminal device may further comprise a sleeve in which the ceramic insulating element and the metal tube are mounted, the sleeve being mounted in the bushing.

The end of the bushing intended to be mounted on the outer periphery of the cable may be secured to the outer sheath of the cable by crimping.

According to a preferred embodiment, the end of the bushing has securing means intended to interact with complementary securing means provided on the outer periphery of the end of the cable, the interaction between the bushing/cable securing means preferably making it possible to generate the compressive force exerted by the tapered tip of the cylinder on the mineral insulation.

Preferably, the complementary securing means consist of an internal thread formed on the inner wall of the bushing and a threaded ring provided on the outer sheath of the cable, the screwing of the bushing on the ring advantageously making it possible to generate the compressive force of the tip of the cylinder on the mineral insulation.

Thus, after assembly, the mineral insulation of the cable and the ceramic insulating element remain in compression, thus providing a dielectric barrier to the cable, even under high temperature conditions.

Advantageously, a bushing/sleeve assembly may accommodate several ceramic insulating elements and associated metal tubes, all of which may be accommodated in said bushing/sleeve assembly but each having a bore adapted to a different conductor diameter. These different conductor diameters generally lead to different cable diameters and in this case, the threaded ring interacting with the bushing is adapted to the diameter of the cable.

A terminal device according to the invention, whether serving as termination or connector, therefore makes it possible to obtain a cable with a device sealed in particular by high temperature brazing and perfectly hermetic without the inclusion of any organic materials or any seal, using only metal and ceramic.

In addition, the insulation is compressed on a cone and in a strong manner, which guarantees a stable interface with the insulation of the cable. This is necessary for high voltage resistance.

The main focus of the device according to the invention is use in a "harsh environment" and safety (nuclear for example).

Thus, it can be used up to an operating temperature of 800° C., or even 1000° C., a maximum operating voltage of up to 6000 VAC (on a ⌀6 mm cable), with resistance to rapid thermal cycling.

It also offers helium tightness (leak rate<10-8 atm·cm3/s), pressure resistance (>250 bar) and very good stability over time because it does not include any organic compounds.

The invention also relates to a shielded cable with mineral insulation, comprising at one end a terminal device comprising a metal bushing, one end of which is secured to the outer periphery of the end of the cable, and a ceramic insulating element, characterized in that said ceramic insulating element consists of a cylinder housed in the bushing via an end which has a bore, in which the stripped conductor of the cable is inserted, said end of the cylinder that is housed in the bushing further having a tapered shape in compression against the mineral insulation surrounding the conductor.

BRIEF DESCRIPTION OF THE DRAWINGS

The invention will now be described in more detail with reference to the drawing, which shows:

FIG. 1 a longitudinal sectional view of a first embodiment of a terminal device according to the invention;

FIG. 2 a longitudinal sectional view of a mineral insulated cable provided with the terminal device according to FIG. 1;

FIG. 3 a perspective view of a terminal device according to the invention as it is mounted on a cable;

FIG. 4 a side perspective view of the cable according to FIG. 1;

FIG. 5 a perspective view of a second embodiment of a terminal device according to the invention;

FIG. 6 a longitudinal sectional view of a third embodiment of a terminal device according to the invention;

FIG. 7 a longitudinal sectional view of a fourth embodiment of a terminal device according to the invention;

FIG. 8 a longitudinal sectional view of a fifth embodiment of a terminal device according to the invention.

DETAILED DESCRIPTION

The terminal device 1 according to the invention is intended to be fitted on a cable 2 with mineral insulation.

Such a cable 2 consists of a metal central conducting wire 21 and a metal outer sheath 22 surrounding said conducting wire 21, a mineral insulating material 23 being inserted between the two. To complete such a cable 2, a terminal device 1 according to the invention is fitted on its end. To fit the terminal device, the cable 2 is stripped, exposing the central conducting wire 21 over a certain length.

This device 1 comprises a metal bushing 3 and a ceramic insulating element consisting of a cylinder 4 housed in said bushing 3. This bushing 3 or base (or fitting) is brazed to the ceramic insulating element 4. This type of termination can be qualified as monobloc.

The bushing 3 has an end for securing to the end of the cable 2, in particular by positioning itself around the outer sheath 22. To this end, the bushing 3 comprises means for securing to the cable 2.

According to a preferred embodiment, these securing means consist of an internal thread formed on the inner wall of the securing end of the bushing 3 and intended to interact with an external thread formed on the outer wall of a ring 5 secured to the end of the outer sheath 22. This ring 5 is in particular secured to the sheath 22 by brazing.

Preferably, a shoulder 31 is provided in the internal bore of the bushing 3 such that by screwing the bushing 3 on the ring 5, the end of the ring 5 and/or of the sheath 22 could come into abutment against said shoulder 31. This defines a securing portion 32 of the bushing 3 extending between its end and the shoulder 31 and having for example the internal thread, and a receiving portion 33, after the shoulder 31 and up to the other end of the bushing 3, in which the ceramic cylinder 4 is housed.

The ceramic cylinder 4 of the device of the invention has a through bore 41, preferably central. This bore 41 is shaped to receive the stripped central conductor 21 of the cable 2.

A metal tube 6 extending partially in the bore 41 and partially projecting from the cylinder, through which the stripped conducting wire 21 may also be engaged, is mounted at one end of the bore 41 and hence of the cylinder 4. This tube 6 is attached to the ceramic insulating element 4 by brazing. The bore 41 may also be closed off, once the conducting wire is engaged, thus forming a cable with a terminal end formed by the device.

As can be seen in FIG. 5, the metal tube 6 may take the form of a cap 60 secured to the end of the cylinder 4.

The cylinder 4 has a circular cross section, the diameter of which is equivalent to the inside diameter of the bushing 3, in the receiving portion thereof. The end 42 of the cylinder 4 housed in the bushing 3 is moreover tapered, preferably conical.

The cylinder 4 has a length allowing it to fit into the bushing 3 such that the conical tip 42 extends beyond the shoulder 31 but is set back from the securing end of the bushing 3.

Thus, during the assembly of the terminal device 1, the device 1 is engaged on the metal conductor 21 of the stripped end of the cable 2 such that the latter engages in the through bore 41 while the bushing 3 is screwed onto the ring 5 carried by the outer sheath 22.

During screwing, the conical tip 42 of the cylinder 4 comes into contact with the mineral insulation 23 and compresses the surface of this insulation 23.

The leakage path is thus lengthened since the conducting wire 21 and the outer sheath 22 are no longer facing one another, the conical tip 42 pushing the mineral insulation 23 away from the end 22a of the sheath 22. For an electric arc to form, it must therefore travel a longer leakage path than that located on the outside of the terminal device. Therefore, the breakdown voltage is higher.

The compressive force of the conical tip 42 on the mineral insulation 23 is generated when the bushing 3 is screwed onto the ring 5 and this compression is managed by controlling the tightening torque.

A preform may also be made on the mineral insulation 23 with a special tool, which optimizes the interface with the ceramic cylinder 4. Making a preform in the crumbly hygroscopic insulation of the cable thus maximizes contact and limits stress on the tip of the conical ceramic.

In order to seal the terminal device 1 on the cable 2, the bushing 3 is brazed to the ring 5. After assembly, the mineral insulation 23 and the ceramic cylinder 4 remain in compression, which offers a new dielectric barrier to the cable 2.

The metal conducting wire 21 protrudes from the projecting end of the metal tube 6, a braze or solder being made between the two.

Preferably, the bushing 3 and the tube 6 are made of an iron/nickel alloy such as FN42, but any other type of alloy or pure metal having an expansion coefficient close to alumina are suitable.

The ring 5 is preferably made of stainless steel, but may also be made of copper or of a nickel-chromium alloy.

Advantageously, a terminal device according to the example of the invention is a connector device and may be used under temperature conditions of up to 700° C., the braze between the ceramic cylinder and the sleeve consisting of an Ag/Cu eutectic alloy. For conditions of use at very high temperatures of up to 1000° C., the braze is preferably 100% copper.

The braze joining the bushing 3 to the outer sheath of the cable 2 may be an Ag/Cu/Zn/Sn alloy such as AG102 having a resistance up to 600° C. or a B/C/Cr/Fe/Si/Ni alloy such as that known under the trade name "Nicrobraz LM" having a resistance up to 1000° C.

The terminal device 1 may further include a sleeve 7 in which the ceramic insulating element 4 and the metal tube 6 are mounted, the sleeve 7 being mounted in the bushing 3. This sleeve 7 is preferably made of alumina.

Advantageously, the bushing 3/sleeve 7 assembly may thus accommodate different ceramic insulating elements and associated metal tube 6 for different conductor diameters. As can be seen in FIGS. 6, 7 and 8, the cables 2a, 2b, 2c have different diameters and in particular conductors of different diameters. Thus, in the same bushing 3/sleeve 7 assembly, it is possible to fit a ceramic insulating cylinder 4a and a tube 6a adapted to the diameter of the conductor 23a, a cylinder 4b and a tube 6b adapted to the cable 23b, along with a cylinder 4c and a tube 6c adapted to the conductor 23c. However, the tube 6 may remain the same, because it is then sized to adapt to several diameters of conductors. This type of termination can be described as adaptive.

Threaded rings 5a, 5b, 5c of dimensions adapted to the outer diameter of the cable 2a, 2b and 2c will thus be selected to interact with the bushing 3.

The invention claimed is:

1. A terminal device for a mineral insulated cable, comprising a metal bushing, one end of which is intended to be secured to the end of the cable, and a ceramic insulating element, wherein said ceramic insulating element consists of a cylinder housed in the bushing, with one end projecting from said bushing and its opposite end, which has a bore housed in the bushing, said end of the cylinder that is housed in the bushing having a tapered shape, the bushing being secured by brazing to the ceramic insulating element.

2. The terminal device as claimed in claim 1, wherein the tapered end of the ceramic insulating element is conical.

3. The terminal device as claimed in claim 1, wherein the ceramic insulating element has a bore, the end of which projecting from the bushing can be closed off, the terminal device thus constituting a termination device.

4. The terminal device as claimed in claim 1, wherein the ceramic insulating element has a through bore at the end of which a metal tube is mounted, at the end of the insulating element projecting from the bushing, the terminal device thus constituting a connector device.

5. The terminal device as claimed in claim 1, wherein the end of the bushing has securing means intended to interact with complementary securing means provided on the outer periphery of the end of the cable.

6. The terminal device as claimed in claim 5, wherein the complementary securing means consist of an internal thread formed on the inner wall of the bushing and a threaded ring intended to be mounted on the outer sheath of the cable.

7. A terminal device for a mineral insulated cable, comprising a metal bushing, one end of which is intended to be secured to the end of the cable, and a ceramic insulating element, wherein said ceramic insulating element consists of a cylinder housed in the bushing, with one end projecting from said bushing and its opposite end, which has a bore housed in the bushing, said end of the cylinder that is housed in the bushing having a tapered shape, wherein the ceramic insulating element has a through bore at the end of which a metal tube is mounted, at the end of the insulating element projecting from the bushing, the terminal device thus constituting a connector device, wherein the ceramic insulating element and the metal tube are mounted in a sleeve which is mounted in the bushing.

8. A shielded cable with mineral insulation made up of a conductor, a metal sheath and a mineral insulating material inserted between the two, comprising at one end a terminal device comprising a metal bushing one end of which is secured to the outer periphery of the end of the cable and a ceramic insulating element, wherein said ceramic insulating element consists of a cylinder housed in the bushing via an end which has a bore in which the stripped conductor of the cable is inserted, said end of the cylinder that is housed in the bushing further having a tapered shape in compression against the mineral insulation surrounding the conductor wherein the end of the bushing is secured on the outer periphery of the end of the cable by crimping.

9. The cable as claimed in claim 8, wherein the cable has, on the outer periphery of the end of the cable, complementary securing means that are complementary to the securing means provided on the bushing of the terminal device.

10. The cable as claimed in claim 9, wherein the complementary securing means consist of an internal thread formed on the inner wall of the bushing and a threaded ring secured by brazing on a metal outer sheath of the cable.

11. A terminal device for a mineral insulated cable, comprising a metal bushing, one end of which is intended to be secured to the end of the cable, and a ceramic insulating element, wherein said ceramic insulating element consists of a cylinder housed in the bushing, with one end projecting from said bushing and its opposite end, which has a bore housed in the bushing, said end of the cylinder that is housed in the bushing having a tapered shape, the bushing being secured by brazing to the ceramic insulating element, the device being configured to serve as termination or connector on a shielded cable with mineral insulation, the tapered shape of the ceramic insulating element allowing the ceramic insulating element to gradually move forward against the mineral insulation, thereby allowing the ceramic insulating element to exert a compressive stress on the mineral insulation, to restore compactness of the mineral insulation, allowing the cable to include a uniform dielectric barrier.

* * * * *